United States Patent [19]
Dorsch et al.

[11] 4,044,560
[45] Aug. 30, 1977

[54] AIR PRESSURE REGULATOR ARRANGEMENT FOR AN INTERNAL COMBUSTION

[75] Inventors: Heinz Dorsch, Leonberg; Julius Weber, Grossingersheim, both of Germany

[73] Assignee: Dr. Ing. h.c.F. Porsche Aktiengesellschaft, Germany

[21] Appl. No.: 700,747

[22] Filed: June 29, 1976

[30] Foreign Application Priority Data

July 1, 1975 Germany .............................. 2529186

[51] Int. Cl.² .................... F02B 23/00; F02B 33/34
[52] U.S. Cl. ...................................... 60/601; 60/611; 60/603
[58] Field of Search ................ 60/598, 600, 601, 602, 60/603, 605, 611; 123/119 C, 119 CF, 119 CE, 140 MP, 198 DB

[56] References Cited

U.S. PATENT DOCUMENTS

| | | | |
|---|---|---|---|
| 2,988,872 | 6/1961 | Reggio | 60/601 |
| 3,107,483 | 10/1963 | Hamilton | 60/64 |
| 3,517,653 | 6/1970 | Ariga et al. | 123/119 DB |

FOREIGN PATENT DOCUMENTS

| | | | |
|---|---|---|---|
| 2,362,133 | 6/1975 | Germany | 60/602 |

*Primary Examiner*—Carlton R. Croyle
*Assistant Examiner*—L. J. Casaregola
*Attorney, Agent, or Firm*—Craig & Antonelli

[57] ABSTRACT

An air pressure regulating arrangement for regulating charging air pressure of an internal combustion engine which is provided with an exhaust gas turbo-charger including a charging blower and an exhaust turbine. A pressure regulating device responding to charging pressure of a charging blower operates a control device arranged in an exhaust channel by passing the exhaust turbine with the charging air pressure between the charging blower and a load regulating member of the internal combustion engine being monitored so that, upon exceeding a predetermined charging air pressure, the fuel supply to the internal combustion engine is interrupted until such time as the charging air pressure is decreased to the predetermined air pressure whereupon the fuel supply to the engine is then restored.

12 Claims, 1 Drawing Figure

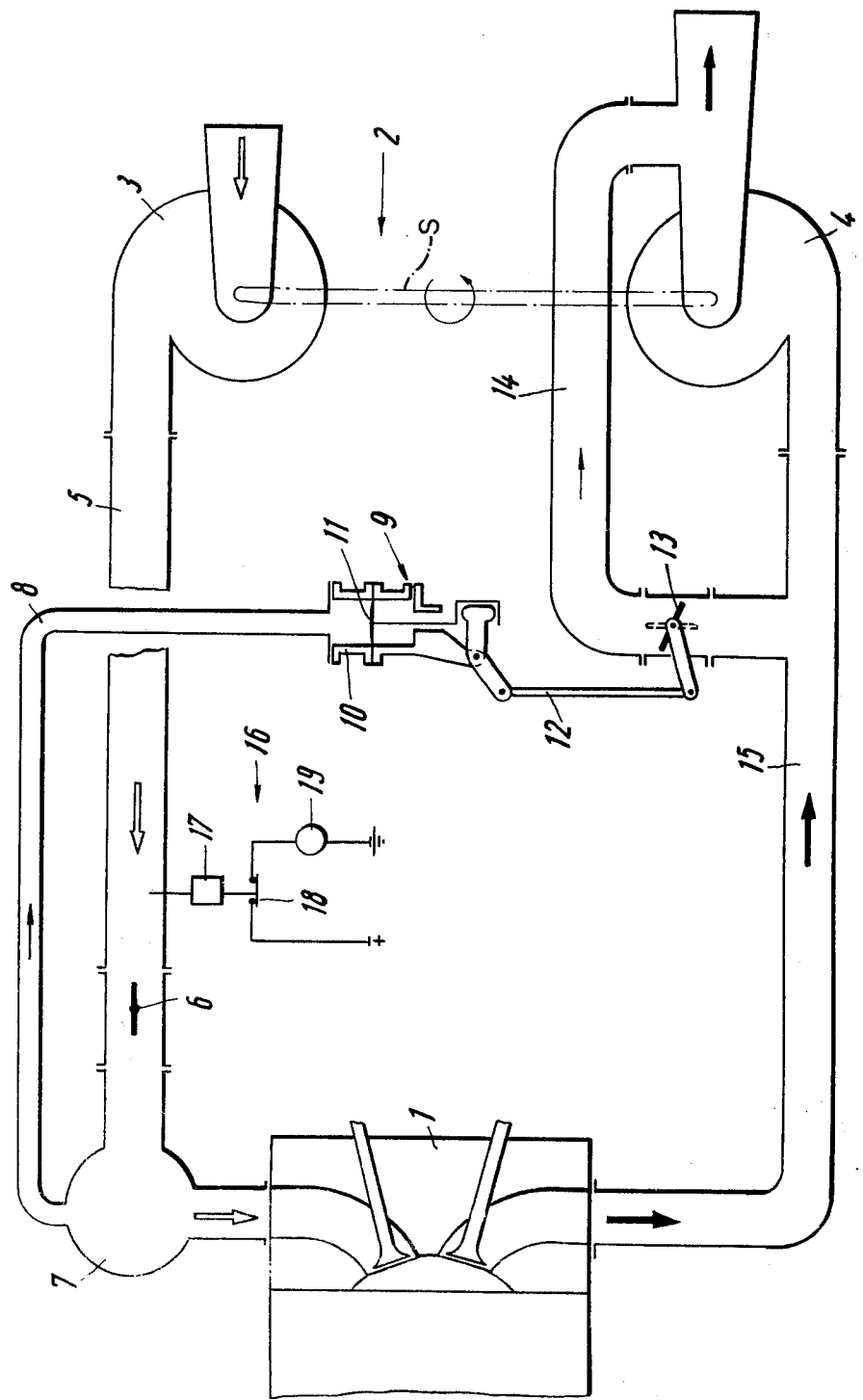

AIR PRESSURE REGULATOR ARRANGEMENT FOR AN INTERNAL COMBUSTION

The present invention relates to an air pressure regulator arrangement and, more particularly, to an air pressure regulator for an internal combustion engine operated with exhaust gas super-charging and which is provided with an exhaust gas turbo-charger including a charging blower, exhaust gas turbine, and an air pressure regulating apparatus which is responsive to a charging pressure of the charging blower to operate a control apparatus arranged in an exhaust channel of the internal combustion engine, which channel circumvents the exhaust gas turbine.

Arrangements for limiting the charging air pressure of an internal combustion engine have been proposed, for example, in D.T.-Gbm 7,207,764, wherein a regulating apparatus is constructed as a pressure box which is connected, at a primary side, through a pressure line with the charging air line of the charging blower and, at a secondary side, through a mechanically acting linkage with a throttle valve or flap arranged in an exhaust gas channel. One disadvantage of this proposed construction lies in the fact that, upon a failure of the regulating apparatus, for example, through a defect in the pressure box or pressure responsive element mounted therein, or a failure of the pressure line, the charging air pressure may increase to an inadmissible or dangerous level, thereby resulting in a damaging of either or both of the charging blower and the exhaust gas turbine.

Accordingly, the aim underlying the present invention essentially resides in providing an improved air pressure regulating arrangement for the charging air of an internal combustion engine. For this purpose, a pressure regulator arrangement is provided in accordance with the present invention whereby, with an increase of the charging air pressure to an inadmissible or dangerous level, the fuel supply to the internal combustion engine is interrupted until such air pressure drops below the inadmissible or dangerous level, whereupon the fuel supply to the engine is then restored.

According to one feature of the present invention, an arrangement is provided which cooperates with the charging air pressure between the charging blower and a power output regulating member of the internal combustion engine, which arrangement, after obtaining a predetermined charging air pressure, interrupts the fuel supply of the internal combustion engine and restores such fuel supply upon the charging air pressure falling below the predetermined charging air pressure. By this construction, it is impossible for the charging air pressure to rise to a value which would result in damaging either or both of the charging air blower and the exhaust gas turbine. By virtue of the interruption and restoring of the fuel supply to the internal combustion engine, a sudden transition from a load operation into a thrust operation and from a thrust operation into a load operation, respectively, is safely avoided so that, at certain vehicle operating conditions as, for example, driving in a curve, no critical situation may occur as a result of a sudden load change.

According to a further feature of the present invention, the arrangement includes a pressure sensing device which, after reaching the predetermined charging air pressure, opens a switch of an electric circuit of a fuel pump of the internal combustion engine whereby the fuel pump is shut off with the pressure sensing device closing the switch when the charging air pressure drops below the predetermined charging air pressure, thereby resupplying the fuel to the internal combustion engine.

According to still another feature of the present invention, the sensing device is adjusted such that the switch of the fuel pump is opened when the charging air pressure rises about 20% above the charging air pressure normally regulated by the charging air pressure regulating device.

Accordingly, it is an object of the present invention to provide an air pressure regulator for an internal combustion engine which avoids the shortcomings and disadvantages encountered in the prior art.

Another object of the present invention resides in providing an air pressure regulator arrangement for an internal combustion engine which prevents the charging air pressure from reaching dangerous levels and thereby adversely affecting the charging blower and/or the exhaust gas turbine.

Still another object of the present invention resides in providing an air pressure regulator arrangement for an internal combustion engine which is functionally safe and cost favorable with respect to manufacture, installation and repair.

These and other objects, features and advantages of the present invention will become more apparent from the following description when taken in connection with the accompanying drawing which shows, for the purposes of illustration only, one embodiment of a pressure regulating arrangement for an internal combustion engine in accordance with the present invention and wherein:

The single FIGURE is a schematic representation of an air pressure regulator arrangement for an exhaust gas turbo-charged internal combustion engine in accordance with the present invention.

Referring now to the single FIGURE of the drawing, an internal combustion engine 1 is provided with an exhaust gas turbo-charger generally designated by the reference numeral 2 which includes a charging blower 3 and an exhaust gas turbine 4, both arranged on the same shaft S with the charging blower 3 and turbine 4 being adapted to be driven by the exhaust gases from the engine 1 in a known manner. The charging blower 3 is connected with a charging air line 5 having arranged therein a load regulating member, for example, a throttle valve or flap 6, which is operated, in a conventional manner, by a gas pedal (not shown). A charging air distributor housing 6 is arranged upstream of the throttle valve 6, as viewed in the direction of flow of the charging air, with the air distributor being connected to inlet passage of the individual cylinders of the internal combustion engine 1.

A pressure line 8 is connected with the charging air distributor housing 7 and with a regulator device generally designated by the reference numeral 9 which functions to maintain the charging air pressure at a predetermined or desired level. The regulator device 9 includes a pressure box 10 having mounted therein a pressure responsive element 11 such as, for example, a membrane or diaphragm. The pressure responsive element 11 is connected to a further throttle valve or flap 13 by way of a force transmission linkage 12. The throttle valve 13 is arranged in an exhaust canal or channel 14 which by-passes the exhaust turbine 4 so as to discharge directly into the atmosphere. The exhaust channel 14 is connected to an exhaust line 15 of the internal combustion engine 1.

A pressure sensing apparatus generally designated by the reference numeral 16 is arranged between the charging blower 3 and the throttle valve 6 of the internal combustion engine and includes a pressure sensing device 17, of conventional construction, responsive to the charging air pressure to operate a switch 18 of an electric circuit of a conventional fuel pump 19.

When the internal combustion engine 1 is in operation, the exhaust gas turbine 4 is driven by the exhaust gases from the internal combustion engine and, in turn, drives the charging blower 3 to supply fresh air under pressure to the internal combustion engine 1 through the charging air line 5. When the throttle valve 6 of the charging air line is opened, the charging air pressure of the charging air blower 3 rises and, when such pressure reaches a predetermined level, the pressure responsive element 11 of the pressure box is displaced by way of the pressure acting thereon through the pressure line 8 whereby the throttle valve 13 arranged in the exhaust channel 14 is opened through the linkage 12. By this arrangement, through the charging pressure, the exhaust energy quantity of the exhaust turbine 4 is limited because a portion of the exhaust energy quantity is discharged through the exhaust channel 14 directly into the atmosphere so that the rotative speed of the charging air blower 3 decreases and the charging air pressure decreases accordingly so that the charging air pressure in the charging air line 5 is maintained at a predetermined level. Upon a failure of the pressure regulating device 9, for example, due to a defective pressure responsive element or a failure in the pressure line 8, switch 18 is opened by the pressure sensing device as soon as the charging air pressure reaches a level which is about 20% above the normal level of the charging air pressure as regulated by the regulating device 9 whereby the electric circuit to the fuel pump 19 is interrupted, thereby interrupting the fuel supply to the internal combustion engine 1. As a result of the interruption of the fuel supply to the internal combustion engine, the rotative speed of the exhaust turbine 4 and charging blower 3 is reduced, thereby decreasing the charging air pressure in the charging air line 5. Upon the charging air pressure decreasing to a safe or normal predetermined level, the pressure sensing device 17 closes the switch 18 of the circuit of the fuel pump 9 whereby the supply of the internal combustion engine is restored.

While we have shown and described only one embodiment in accordance with the present invention, it is understood that the same is not limited thereto but is susceptible of numerous changes and modifications as known to a person skilled in the art, and we therefor do not wish to be limited to the details shown and described herein but intend to cover all such changes and modifications as are encompassed by the scope of the appended claims.

We claim:

1. An air pressure regulating arrangement for an internal combustion engine which includes a supercharging means for supplying a quantity of charging air to the internal combustion engine, the arrangement comprising:

means operatively associated with the supercharging means for interrupting a supply of fuel to the internal combustion engine upon a pressure of the charging air supplied to the internal combustion engine by the supercharging means reaching a predetermined charging pressure and for restoring a supply of fuel to the internal combustion engine upon the pressure of charging air dropping below the predetermined charging pressure.

2. An arrangement according to claim 1, wherein the supercharging means includes charging blower means and an exhaust gas turbine means for driving said charging blower means, and wherein means are operatively associated with said charging blower means and said exhaust gas turbine means for controlling the charging pressure of the charging air supplied to the internal combustion engine.

3. An arrangement according to claim 2, wherein means are provided for by-passing the exhaust gas turbine means, said means for controlling the charging pressure including a control member arranged in said by-pass means and a means responsive to the charging pressure for selectively positioning said control member to and from a by-pass position such that the charging pressure is normally maintained at a preselected charging pressure.

4. An arrangement according to claim 3, wherein a load regulating means is interposed between the charging blower means and the internal combustion engine, and wherein said fuel interrupting and restoring means is arranged between said load regulating means and said charging blower means.

5. An arrangement according to claim 4, wherein a fuel pump means is provided for supplying fuel to the internal combustion engine, and wherein said means for interrupting and restoring the fuel supply to the internal combustion engine is connected to said fuel pump means for controlling the operation thereof in response to the charging pressure of the air supplied to the internal combustion engine.

6. An arrangement according to claim 5, wherein said fuel pump means includes an electric circuit means for operating the same, said electric circuit means including a switch means, said means for interrupting and restoring the fuel supply including a pressure sensing means operatively connected with said switch means to selectively open and close said switch means when the charging pressure of the charging air supplied to the internal combustion engine reaches the predetermined charging pressure and decreases below the predetermined charging pressure, respectively.

7. An arrangement according to claim 6, wherein said pressure sensing means opens said switch means to interrupt the supply of fuel to the internal combustion engine when the charging air pressure rises about 20% above the preselected charging pressure.

8. An arrangement according to claim 4, wherein said fuel interrupting and restoring means interrupts the supply of fuel to the internal combustion engine when the charging air pressure rises about 20% above the preselected charging pressure and restores the supply of fuel when the charging air pressure decreases to the preselected charging pressure.

9. An arrangement according to claim 1, wherein a fuel pump means is provided for supplying fuel to the internal combustion engine, and wherein said means for interrupting and restoring the fuel supply to the internal combustion engine is connected to said fuel pump means for controlling the operation thereon in response to the charging pressure of the air supplied to the internal combustion engine.

10. An arrangement according to claim 9, wherein said fuel pump means includes an electric circuit means for operating the same, said electric circuit means including a switch means, said means for interrupting and restoring the fuel supply including a pressure sensing means operatively connected with said switch means to selectively open and close said switch means when the charging pressure of the charging air supplied to the internal combustion engine reaches the predetermined charging pressure and decreases below the predetermined charging pressure, respectively.

11. An arrangement according to claim 10, wherein said pressure sensing means opens said switch means to interrupt the supply of fuel to the internal combustion engine when the charging air pressure rises about 20% above the preselected charging pressure.

12. An arrangement according to claim 1, wherein means are operatively connected with said supercharging means for controlling the charging air pressure of the charging air supplied by the super-charging means such that the charging air pressure is normally maintained at a preselected charging pressure, and wherein said means for interrupting and restoring the fuel supply to the internal combustion engine interrupts the fuel supply to the internal combustion engine when the charging air pressure rises about 20% above the preselected charging pressure and restores the fuel supply when the charging air pressure decreases to the preselected charging pressure.

* * * * *